C. R. WEISS.
CASING FOR DRIVE CHAINS.
APPLICATION FILED JAN. 11, 1918.
1,266,187.
Patented May 14, 1918.
2 SHEETS—SHEET 1.
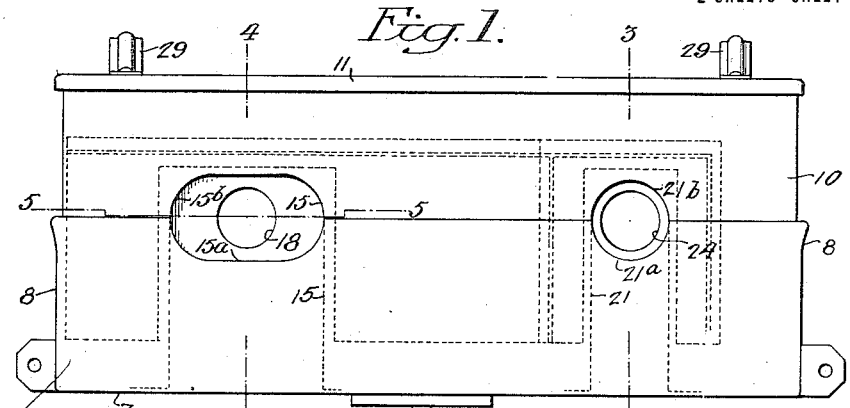
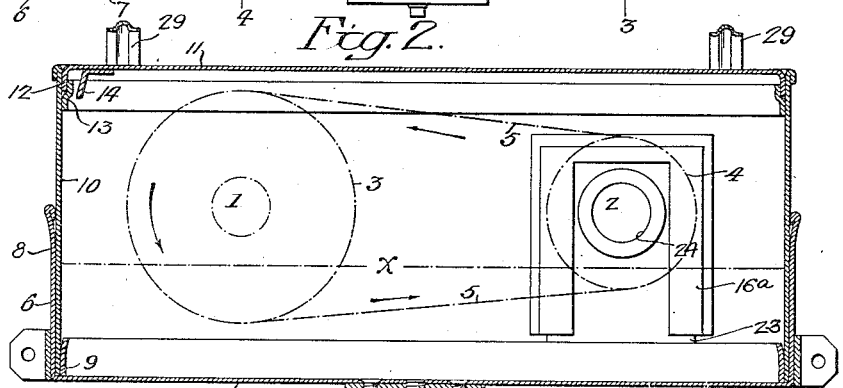
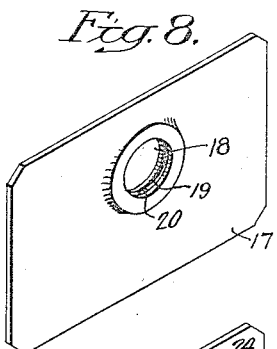
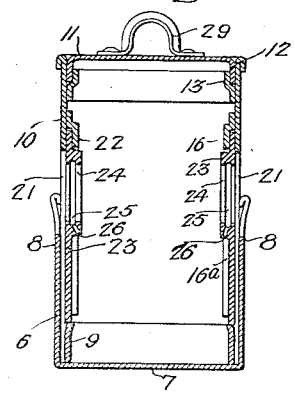
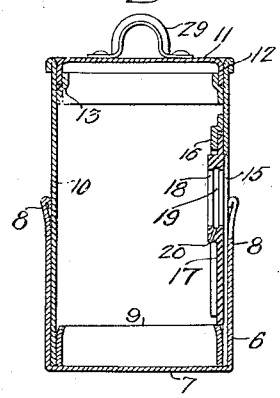
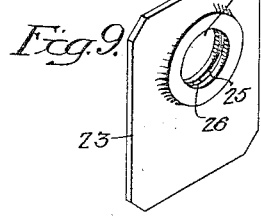
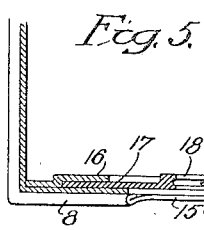
Inventor,
Charles R. Weiss,
by his Attorneys C. R. WEISS.
CASING FOR DRIVE CHAINS.
APPLICATION FILED JAN. 11, 1918.
1,266,187.
Patented May 14, 1918.
2 SHEETS—SHEET 2.
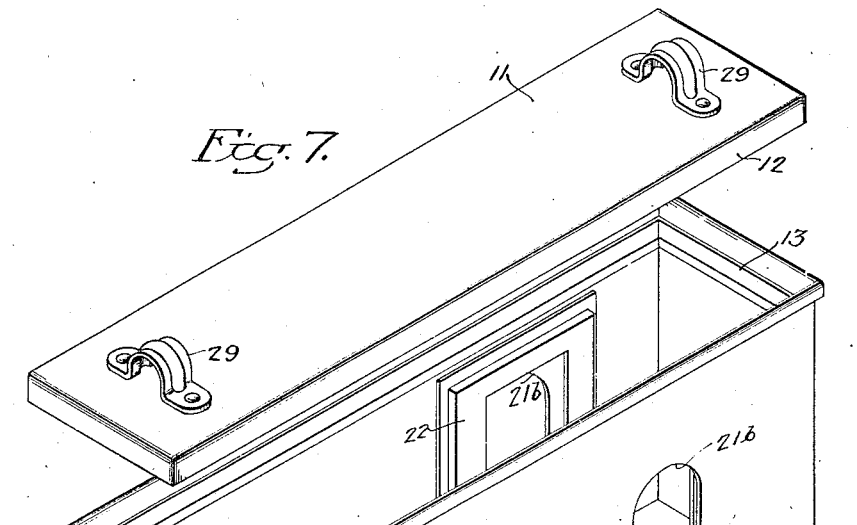
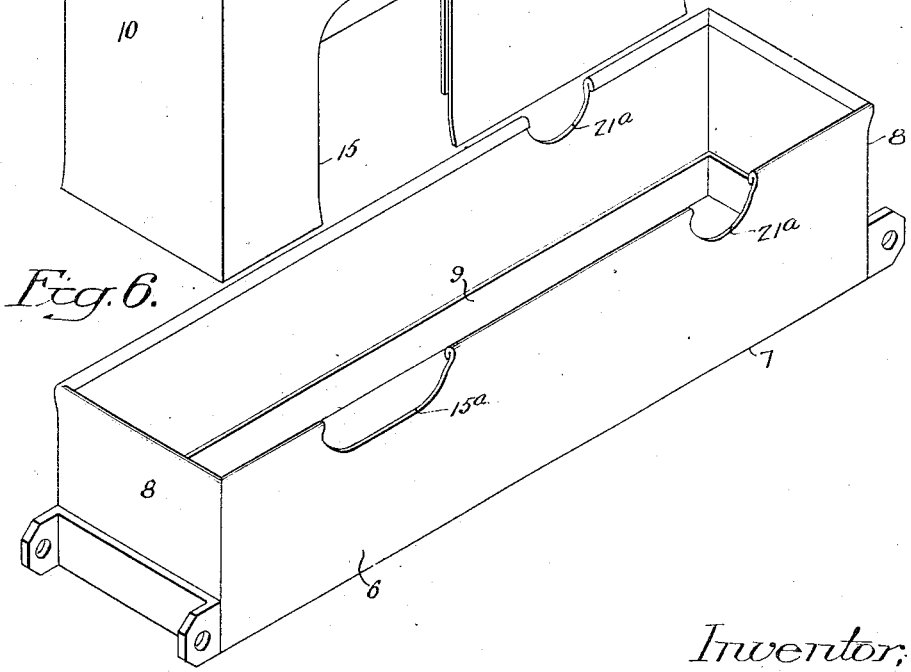
Inventor,
Charles R. Weiss,
by his Attorneys,
Howson & Howson

UNITED STATES PATENT OFFICE.

CHARLES R. WEISS, OF PHILADELPHIA, PENNSYLVANIA, ASSIGNOR TO LINK-BELT COMPANY, OF CHICAGO, ILLINOIS, A CORPORATION OF ILLINOIS.

CASING FOR DRIVE-CHAINS.

1,266,187.     Specification of Letters Patent.     Patented May 14, 1918.

Application filed January 11, 1918. Serial No. 211,370.

*To all whom it may concern:*

Be it known that I, CHARLES R. WEISS, a citizen of the United States, residing in Philadelphia, Pennsylvania, have invented certain Improvements in Casings for Drive-Chains, of which the following is a specification.

My invention relates to certain improvements in casings for inclosing driving chains and their sprocket wheels which require constant lubrication. The invention can also be used for inclosing gearing that requires constant lubrication.

One object of my invention is to provide a casing made in two or more parts and which can be assembled after the chain is in place on the sprocket wheels and can be readily removed when access to the chain is desired.

A further object of the invention is to design the casing so that the oil that is splashed will be retained in the casing and will not leak through the casing at the joints.

In the accompanying drawings:

Figure 1 is a side view of my improved chain drive casing;

Fig. 2 is a longitudinal sectional view of the casing;

Fig. 3 is a transverse sectional view on the line 3—3, Fig. 1;

Fig. 4 is a transverse sectional view on the line 4—4, Fig. 1;

Fig. 5 is a fragmentary sectional plan view on the line 5—5, Fig. 1;

Fig. 6 is a detached perspective view of the base section of the casing;

Fig. 7 is a detached perspective view of the upper section of the casing with the lid detached; and Figs. 8 and 9 are detached perspective views of the plates which are mounted on the shaft carrying the sprocket wheels.

The casing can be made of any size, depending upon the diameters of the sprocket wheels and the length of the chain. In the drawings, I have shown the drive chain in dotted lines.

1 is the driving shaft. 2 is the driven shaft. 3 is a sprocket wheel mounted on the driving shaft. 4 is the sprocket wheel mounted on the driven shaft and 5 is the chain which passes around both wheels. In the present instance, the chain is traveling in the direction of the arrow, Fig. 2, and the height of the oil in the casing is indicated at $x$. The height of the oil may vary, but there should be sufficient oil in the casing to submerge the lower section of the chain.

6 is the base section, which can be secured to the frame in any suitable manner and this base section has a bottom 7 and sides 8 terminating about half-way of the height of the casing, and, in the present instance, on a line with the shafts 1 and 2. The upper edge of the base section is turned in, as shown, and extending around the bottom of the interior of the casing is a flange 9 forming a channel for the reception of the lower end of the upper section 10, also made rectangular, and which fits snugly in the lower section. This construction prevents the oil from being forced out between the two sections and over the edge of the upper section. The flange 9 is slightly flared at the upper edge so that the upper section can be readily placed in position. In the present instance, the cover 11 is detachable from the upper section although, in some instances, it may be made integral therewith, where access to the chain gearing is not desired.

The cover section 11 has a flange 12 around its edge which extends into a channel at the upper edge of the upper section formed by a bent plate 13 and the body of said upper section. At one end of the cover section is a splash plate 14 against which the oil, thrown from the chain, strikes, when the chain is driven in the direction of the arrow, Fig. 2. If it be driven in the opposite direction, then this splash plate is placed at the opposite end of the casing.

In order to close the opening for the shafts and to allow for adjustment to take up the wear of the chain plates 17 and 22, I provide in the casing an elongated slot 15, which is formed partly in the lower section, as at $15^a$, and partly in the upper section, as at $15^b$. On the upper section is a plate 16, which is spaced from the wall of the casing, as shown in Figs. 4 and 5, and mounted between this plate and the inner wall of the casing is a rectangular cover plate 17 having an enlargement 18, preferably of Babbitt metal, which fits the driving shaft in the present instance. In this enlargement is an oil groove 19 for collecting the oil, and communicating with this groove is a passage 20, which leads any oil that would creep along the shaft back into the casing. At the opposite end of the casing is a slot 21 formed partly in the lower section, as at 21$^a$, and partly in the upper section, as at 21$^b$. This slot 21$^b$ is in both sides of the casing, as shown in Figs. 3 and 7. In the present instance, the plate 16 extends substantially the full length of the casing and has a slot 16$^a$ for the driven shaft in line with the slot 21 in the casing. On the opposite side of the casing is a plate 22 spaced the same distance from the casing as the plate 16, only this plate extends on each side of the slot for the driven shaft. Mounted in the space between the plates and the upper section of the casing is a cover plate, or washer, 23, Fig. 9, which has an enlargement 24, surrounding the shaft, and in this enlarged portion is an oil groove 25, which communicates with the interior of the casing through a diagonal passage 26, the same as the oil groove in the plate 17. The plates 17 and 23 are loosely mounted in the casing so that they will accommodate themselves to the two shafts. The plates are of a greater width than the openings in the sections of the casings and they prevent the escape of oil from the casing when it is splashed by the chain running at high speed. In fact, all of the joints of the casing are such as to prevent the escape of oil, which is in motion when the drive chain is driven.

In the bottom of the lower section of the casing is an oil opening 27, closed by a plug 28. The cover 11 has a suitable handle 29 in the present instance.

The upper edge of the lower section is slightly flared, or beaded, to allow for the ready insertion of the upper section and to break up any capillary action, and the lower edge of the upper section is also slightly flared so as to make a neat fit and to break up any capillary action. Instead of the babbitted sealing plates, as shown in Figs. 8 and 9, these plates may be made of steel, or a combination of leather and steel.

The above construction of the casing not only prevents oil from escaping through leakage, but it also prevents dust and lint gaining access to the chain drive or gearing.

When it is desired to take up the chain, due to wear, this can be readily accomplished without disturbing the box, as the plate 17, mounted on the driving shaft, is free to slide in the box.

I claim:

1. In a casing for a drive chain, or gearing, the combination of a lower section having side and end walls and recessed for the accommodation of the shafts; an upper section adapted to fit in the lower section and also recessed for the accommodation of the shafts, said upper section extending to a point below the line of the oil in the lower section.

2. In a casing for a drive chain, or gearing, the combination of a lower section having side and end walls and recessed for the accommodation of the shafts; an upper section adapted to fit in the lower section and also recessed for the accommodation of the shafts, said upper section extending to a point below the line of the oil in the lower section, the lower section having an internal flange at its bottom forming an annular recess into which the lower edge of the upper section extends.

3. The combination in a casing, of a lower section having a bottom and side and end walls, the side walls of said lower section being recessed to accommodate the driving and the driven shafts and having, near the bottom, an internal flange spaced from the side walls to form a recess; an upper section extending above the upper edge of the lower section and having side walls extending down into the recess formed between the walls of the lower section and the bottom flange; and plates mounted on the shafts and closing the recesses in the two sections of the casing so as to prevent the escape of oil from the casing.

4. The combination in a casing for drive chains, or gearing, of a lower section having side and end walls and recessed to accommodate the shafts, the upper edge of the section being flared; an upper section adapted to fit in the lower section and recessed for the accommodation of the shafts, the lower edge of the upper section being flared, said upper section extending to a point below the line of oil in the lower section; and cover plates mounted on the shafts and adapted to grooves in the upper section.

5. The combination in a casing for drive chains, or gearing, of a lower section having an internal flange near its bottom; an upper section fitting within the lower section, the lower edge of the upper section extending into the space formed by the flange and the lower section; a flange at the upper end of the upper section forming a recess; a detachable cover plate having a flange extending into the recess at the upper section, the upper section having slots to accommodate the driving and driven shafts; cover plates on the shafts closing said slots; and a splash plate secured to the detachable cover plate.

6. The combination in a casing for a chain drive, of a lower section having side walls, end walls and a bottom, said lower section having a flared internal flange near its bottom; an upper section fitting in the lower section and extending into the space between the flange and the side and end walls of the lower section, the sides of the upper section being slotted for the accommodation of the two shafts, one of said slots being elongated to allow for adjustment; cover plates mounted on the shafts and adapted to close the slots, said cover plates being enlarged at the shafts and having grooves therein acting as oil traps; and a recess leading from each groove back to the interior of the casing so that any oil traveling on the shaft will be deflected back into the interior of the casing.

In witness whereof I affix my signature.

CHARLES R. WEISS.